(12) United States Patent
Wildash (10) Patent No.: US 8,717,791 B2
(45) Date of Patent: May 6, 2014

(54) BRIDGELESS BOOST PFC CIRCUITS AND SYSTEMS

(75) Inventor: Kevin D. Wildash, Adelaide (AU)

(73) Assignee: ASTEC International Limited, Kwun Tong, Kowloon (HK)

( * ) Notice: Subject to any disclaimer, the term of this patent is extended or adjusted under 35 U.S.C. 154(b) by 1069 days.

(21) Appl. No.: 12/570,021

(22) Filed: Sep. 30, 2009

(65) Prior Publication Data

US 2011/0075462 A1    Mar. 31, 2011

(51) Int. Cl.
*H02M 7/04* (2006.01)
*H02M 5/42* (2006.01)
*H02M 7/68* (2006.01)

(52) U.S. Cl.
USPC ............................................. 363/89; 323/207

(58) Field of Classification Search
USPC ............................................. 363/89; 323/207
See application file for complete search history.

(56) References Cited

U.S. PATENT DOCUMENTS

| | | | |
|---|---|---|---|
| 7,164,591 B2 | 1/2007 | Soldano | |
| 7,215,560 B2 | 5/2007 | Soldano et al. | |
| 7,269,038 B2 | 9/2007 | Shekhawat et al. | |
| 7,355,868 B2 | 4/2008 | Soldano | |
| 2005/0105311 A1* | 5/2005 | Soldano | 363/89 |
| 2006/0132104 A1* | 6/2006 | Li | 323/207 |
| 2006/0220628 A1* | 10/2006 | Soldano | 323/282 |
| 2007/0058402 A1* | 3/2007 | Shekhawat et al. | 363/89 |
| 2009/0230929 A1* | 9/2009 | Sui et al. | 323/207 |
| 2009/0256543 A1* | 10/2009 | Yang | 323/284 |

* cited by examiner

*Primary Examiner* — Jue Zhang
(74) *Attorney, Agent, or Firm* — Harness, Dickey & Pierce, P.L.C.

(57) ABSTRACT

Bridgeless boost PFC circuits and systems providing an improved method of current sensing using two current sensing resistors is envisaged. Analog switches are provided to select one of the two current sensing resistors based on the polarity of the AC line. An amplifier is provided to eliminate use of resistors with large values, thus resulting in lower power loss and efficient systems.

15 Claims, 6 Drawing Sheets

(PRIOR ART)

FIG. 1

(PRIOR ART)

FIG. 10

BRIDGELESS BOOST PFC CIRCUITS AND SYSTEMS

FIELD

The present disclosure relates to the field of bridgeless boost PFC circuits and systems. In particular, this disclosure relates to current sensing in bridgeless boost PFC circuits and systems.

BACKGROUND

This section provides background information related to the present disclosure which is not necessarily prior art.

Power factor of an alternating current (AC) electric power system is defined as the ratio of the real power to the apparent power flowing to a load, and is a number between 0 and 1 (frequently expressed as a percentage, e.g. 0.5 pf=50% pf). In an electrical power system, a load with a low power factor draws more current than a load with a high power factor for the same amount of useful power transferred. The higher currents increase the energy lost in a power distribution system, and necessitate the use of large instruments and correspondingly large interconnecting cables. Hence, there is always a need for power supplies with improved power factor.

Power Factor Correction (PFC) allows the distribution of power at maximum efficiency. There are two types of PFCs viz., active PFC and passive PFC. Active PFC uses a circuit to correct the power factor and is able to generate a theoretical power factor of over 95%. Active PFC also markedly diminishes total harmonics, automatically corrects the AC input current, and is capable of handling a full range of input voltages. Passive PFC uses a capacitive filter at the AC input to correct poor power factor. Passive PFC requires that the AC input voltage be set manually and also does not use the full energy potential of the AC line.

The Total Harmonic Distortion (THD) of a signal is a measurement of the harmonic distortion present in a system and is defined as the ratio of the sum of the powers of all harmonic components to the power of the fundamental frequency. Lesser THD allows a more accurate reproduction of signals by reducing harmonics added as a result of the electronic components present in the system. Hence power system designs must take into consideration the THD performance of the system.

Semiconductor switches are used in a power factor correction (PFC) system to control the flow of power to a load. Typically, integrated circuits (ICs) or digital signal processors (DSPs) are used to control the duty cycles of the semiconductor switches.

Figure 1:
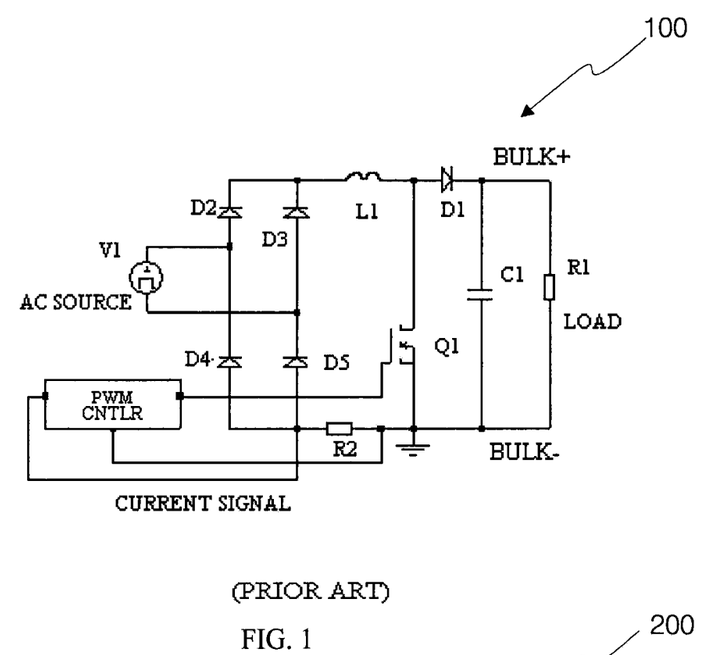
FIG. 1 illustrates a prior art PFC system that uses a diode bridge rectifier and PWM control using resistive current sensing.
Figure 2:
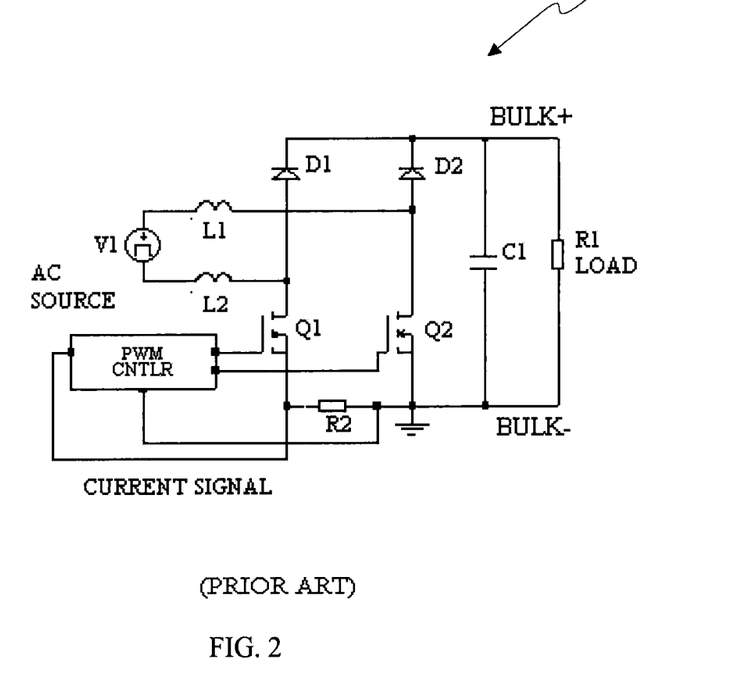
FIG. 2 illustrates a prior art bridgeless boost PFC system with PWM control using only one current sensing resistor.

A prior art power factor correction (PFC) system 100 that uses a diode bridge rectifier and PWM (pulse width modulation) control using resistive current sensing is illustrated in FIG. 1. FIG. 2 illustrates a prior art bridgeless boost power factor correction (PFC) system 200 with PWM (pulse width modulation) control using only one current sensing resistor.

Various techniques have been used to provide an improved method of current sensing in a PFC circuit.

SUMMARY

This section provides a general summary of the disclosure, and is not a comprehensive disclosure of its full scope or all of its features.

According to one aspect of this disclosure, a method of operating a bridgeless boost PFC system is disclosed. The PFC system has a controller for controlling operation of the system to produce a direct current (DC) output from an alternating current (AC) input having a first half cycle and a second half cycle. The PFC system includes an input for receiving the AC input, a first boost inductor and a second boost inductor coupled to the input, a first power switch coupled to the first inductor, a second power switch coupled to the second inductor, a first sensor coupled in series with the first power switch, and a second sensor coupled in series with the second power switch. The method includes coupling an output of the first sensor to the controller during substantially all of the first half cycle and coupling an output of the second sensor to the controller during substantially all of the second half cycle.

According to another aspect of this disclosure, A bridgeless boost power factor correction (PFC) system includes a controller for controlling operation of the system to produce a direct current (DC) output from an alternating current (AC) input and an input for receiving an AC input. The input has a first input terminal and a second input terminal. A first boost inductor is coupled to the first input terminal and a second boost inductor is coupled to the second input terminal. A first power switch is coupled to the first inductor and a second power switch is coupled to the second inductor. A first sensor is coupled in series with the first power switch to generate a first current signal and a second sensor coupled in series with the second power switch to generate a second current signal. The PFC system includes a selection circuit coupled to the first sensor and the second sensor. The selection circuit is adapted to alternately couple the first current signal and the second current signal to the controller.

According to one example embodiment, a bridgeless boost power factor correction (PFC) system includes a first input for connection to a first line of an alternating current (AC) source and a second input for connection to a second line of the AC source. The PFC system includes an output for delivering an output of the bridgeless boost PFC system, a first boost choke coupled to the first input and a second boost choke coupled to the second input. At least one current sensing resistor is coupled in series with a source terminal of a semiconductor switch in each return path of the current through the first boost choke and the second boost choke during each half cycle of the AC source. A PWM controller is adapted to control the semiconductor switch in each of said return paths, to further control the flow of current to a load to achieve power factor correction. At least one switching means is coupled to each of said current sensing resistors to alternatively enable or prevent the transmission of sensed current signals to the PWM controller. A logic inverter is adapted to change the state, alternatively, of said switching means during each half cycle of the AC source and an AC polarity sensing circuit is adapted to provide signals corresponding to each half cycle of the AC source to the PWM controller and said logic inverter.

According to yet another embodiment, a method for power factor correction in a bridgeless boost PFC system is disclosed. The method includes providing at least one current sensing resistor coupled in a return path of the current through a first boost choke and a second boost choke during each half cycle of an alternating current (AC) source. The method further includes sensing the current flowing through the first boost choke and the second boost choke during each half cycle of the AC source. The method also includes using a sensed current signal to drive a PWM controller for selectively controlling the operation of a semiconductor switch in said return path of the current through the first boost choke and the second boost choke during each half cycle of the AC source and further controlling the flow of current to a load for achieving power factor correction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes of selected embodiments only and are not intended to limit the scope of the present disclosure.

Corresponding reference numerals/indicia indicate corresponding parts throughout the several views of the accompanying drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The present disclosure envisages a bridgeless boost power factor correction system using resistive current sensing.

According to one aspect of the present disclosure, a method of operating a bridgeless boost PFC system is disclosed. The PFC system has a controller for controlling operation of the system to produce a direct current (DC) output from an AC input having a first half cycle and a second half cycle. The PFC system includes an input for receiving the AC input, a first boost inductor and a second boost inductor coupled to the input, a first power switch coupled to the first inductor, a second power switch coupled to the second inductor, a first sensor coupled in series with the first power switch, and a second sensor coupled in series with the second power switch. The method includes coupling an output of the first sensor to the controller during substantially all of the first half cycle and coupling an output of the second sensor to the controller during substantially all of the second half cycle.

In a PFC system according to this disclosure, the first power switch of the PFC system is turned on (i.e., closed, conducting, etc.) continuously for substantially all of the first half cycle and the second power switch of the PFC system is turned on continuously for substantially all of the second half cycle. For each half cycle, the power switch that is not on for substantially all of that half cycle is switched on and off according to known methods of operating a bridgeless boost PFC system. The sensor coupled in series with the power switch that is on is in the return path of current through the inductors of the PFC system and produces a current signal that represents the current through the inductors of the PFC system. According to the method disclosed herein, the output of the first sensor is coupled to the controller during the first half cycle (when the first switch is continuously on for substantially all of the first half cycle) to provide the controller with a signal representing the current through the inductors. During this first half cycle, the output of the second sensor (which will be a pulsed signal that does not reflect current through the inductors due to the switching of the second switch during this first half cycle) is not coupled to the controller. Conversely, during the second half cycle (when the second switch is continuously on for substantially all of the half cycle) the output of the second sensor is coupled to the controller to provide the controller with a signal representing the current through the inductors. During this second half cycle, the output of the first sensor is not coupled to the controller.

The alternating coupling of the first and second current signals to the controller may be accomplished by any appropriate technique. According to one example, the PFC system includes a first selection switch coupled to the first sensor and a second selection switch coupled to the second sensor. The first selection switch is closed for substantially all of the first half cycle to couple the output of the first sensor to the controller. Similarly, the second selection switch is closed for substantially all of the second half cycle to couple the output of the second sensor to the controller.

The selection switches may be any suitable switch. For example, the selection switches may be analog switches, bipolar junction transistors (BJTs), diode switches, etc.

An example bridgeless boost power factor correction (PFC) system for performing according to at least one aspect discussed above includes a controller for controlling operation of the system to produce a direct current (DC) output from an alternating current (AC) input and an input for receiving an AC input. The input has a first input terminal and a second input terminal. A first boost inductor is coupled to the first input terminal and a second boost inductor is coupled to the second input terminal. A first power switch is coupled to the first inductor and a second power switch is coupled to the second inductor. A first sensor is coupled in series with the first power switch to generate a first current signal and a second sensor coupled in series with the second power switch to generate a second current signal. The PFC system includes a selection circuit coupled to the first sensor and the second sensor. The selection circuit is adapted to alternately couple the first current signal and the second current signal to the controller.

The first sensor and the second sensor may be any suitable sensors for sensing current. In one example, the first and second sensors are resistors. In another example, each of the first and second sensors includes at least one current transformer.

The selection circuit of the PFC system may include a first selection switch coupled to the first sensor and a second selection switch coupled to the second sensor. The selection circuit is adapted to alternately close the first selection switch and the second selection switch to alternately couple the first current signal and the second current signal to the controller.

The PFC system may further include a polarity detector. The polarity detector is coupled to the first selection switch and the second selection switch to alternately close the first selection switch and the second selection switch.

The PFC system's selection circuit may include an amplifier to amplify whichever of the first current signal and the second current is coupled to the controller. Inclusion of the amplifier may permit the use of sensors having lower output voltages (i.e., current signals) than are useable by the controller. For example, the sensors can be low resistance resistors. Using low resistance resistors as sensors results in smaller power losses in the PFC system, but the sensor output voltage may be too low, without amplification, for the controller to use.

Without limiting the aspects and/or embodiments discussed above, further embodiments of the present disclosure, which may or may not include one or more aspect discussed above, will be discussed hereinafter FIG. 3 illustrates a bridgeless boost PFC system with resistive current sensing in accordance with the present disclosure and is referenced generally by numeral 300. This system is explained in detail herein below. An input AC power supply V1, typically having a frequency of 50 Hz or 60 Hz and supplying a voltage of 110V AC or 220V AC is provided. In order to control the current flowing to a load R1, a PWM controller PWM CNTRL requires a signal which is proportional to the current in boost chokes L1 and L2. Two current sensing resistors R2 and R3 are connected in series with the source terminals of two semiconductor switches Q1 and Q2 respectively. The switches Q1 and Q2 are typically MOSFETs (Metal Oxide Semiconductor Field Effect Transistors). For any given AC line half cycle, the switch which is 'ON' continuously will conduct a current which reflects the current in boost chokes L1 and L2 and will be sensed by one of the two current sensing resistors (R2 or R3). The expression 'ON' is used to mean that a device such as a semiconductor switch is in a fully conducting state.

Figure 3:
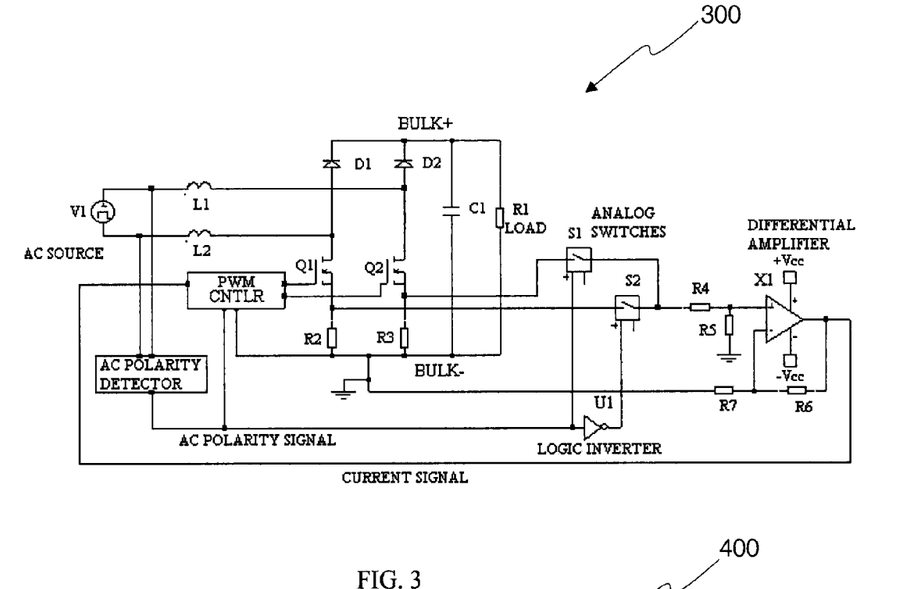
FIG. 3 illustrates a bridgeless boost PFC system with resistive current sensing in accordance with the present disclosure.

The boost chokes L1 and L2 are adapted to receive and store boost energy from the input AC power supply V1. A combination of a pair of rectifier diodes (D1 and D2) and semiconductor switches (Q1 and Q2) are adapted to receive inputs from the boost chokes L1 and L2 and alternatively conduct selectively with respect to the cycle of the AC power supply. Switching means comprising analog switches S1 and S2 are used to enable or prevent the transmission of current signals sensed by the current sensing resistors R2 and R3. An AC polarity detector senses the polarity of the AC line and enables one of the two analog switches (S1 or S2). A logic inverter U1 ensures that the analog switch (S1 or S2) that is not enabled has the opposite state in response to signals from the AC polarity detector. For a given AC line polarity, the AC polarity detector also ensures that the correct MOSFET is switching while the other MOSFET is biased 'ON' continuously.

A differential amplifier X1 is connected between the switching means (S1 and S2) and the PWM controller PWM CNTRL to boost the current signal by a factor of about five. A low voltage gain allows the differential amplifier X1 to have a bandwidth to follow the high frequency switching component of the current through the boost chokes L1 and L2.

The analog switches S1 and S2 are selected typically from the CD4000 series logic chips including CD4066, a quad analog switch. The differential amplifier X1 is implemented using an amplifier selected typically from a family of self-calibrating precision CMOS rail-to-rail output operational amplifiers including TLC4501A. The system illustrated in FIG. 3 is designed for a voltage gain of five and hence resistors R4 and R7 are selected with a value of 10K and resistors R5 and R6 are selected with a value of 50K. However, the system in accordance with the present disclosure shown in FIG. 3 can be designed for other values of low voltage gain and the resistors can be selected accordingly.

The switching means (S1 and S2) can also be selected from a group of switching means consisting of analog switches, Bipolar Junction Transistors (BJTs) and diodes.

Figure 4:
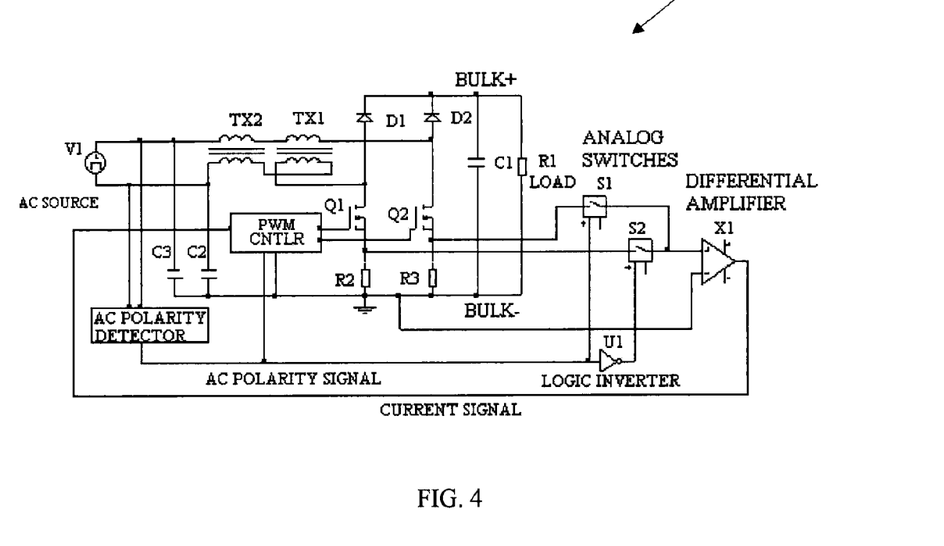
FIG. 4 illustrates an application of the system of FIG. 3 to a bridgeless boost PFC system using common mode (CM) choke and X capacitors to reduce CM electromagnetic interference (EMI).

FIG. 4 illustrates an application of the system in accordance with the present disclosure to a bridgeless boost PFC system using common mode (CM) choke TX2 and X capacitors C2 and C3 to attenuate CM electromagnetic interference (EMI). Two current sensing resistors R2 and R3 are connected in the circuit to provide a sensed current signal to a PWM controller PWM CNTRL in the same way as described in the embodiment illustrated in FIG. 3 above.

Figure 5:
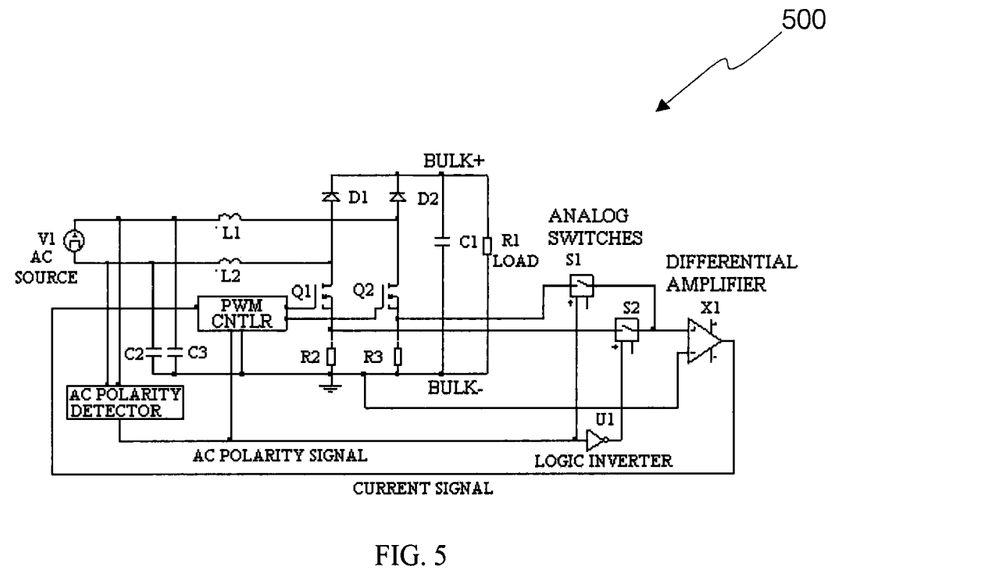
FIG. 5 illustrates an application of the system of FIG. 3 to a bridgeless boost PFC system using only X capacitors to reduce common mode electromagnetic interference (CM EMI).

FIG. 5 illustrates an application of the system in accordance with the present disclosure to a bridgeless boost PFC system using only X capacitors C2 and C3 to attenuate common mode electromagnetic interference (CM EMI). Two current sensing resistors R2 and R3 are connected in the circuit to provide a sensed current signal to a PWM controller PWM CNTRL in the same way as described in the embodiment illustrated in FIG. 3 above.

Figure 6:
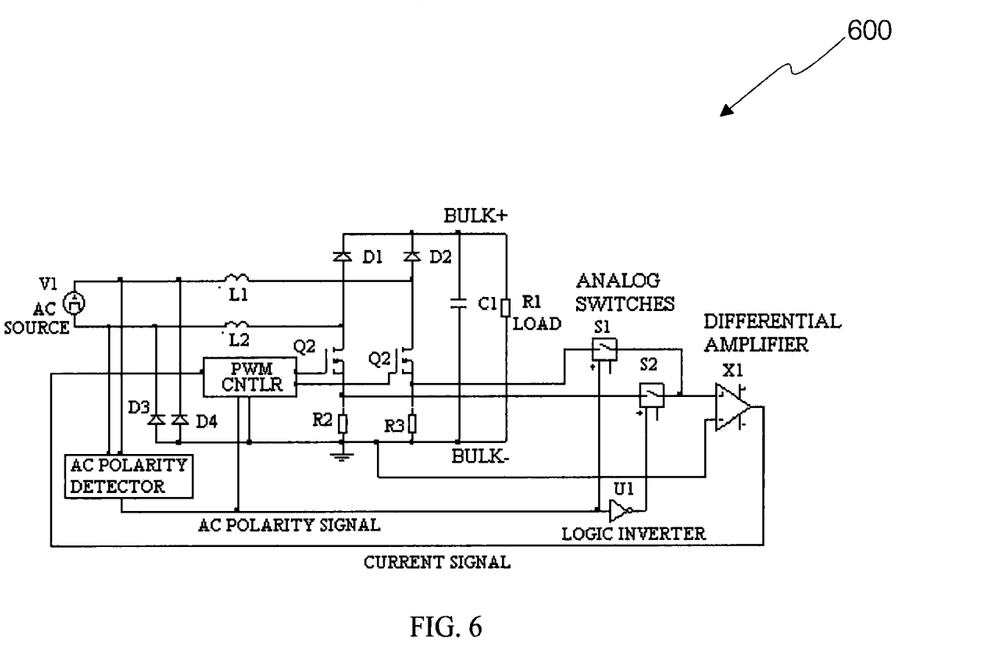
FIG. 6 illustrates an application of the system of FIG. 3 to a bridgeless boost PFC system with input diodes to reduce common mode electromagnetic interference (CM EMI).

FIG. 6 illustrates an application of the system in accordance with the present disclosure to a bridgeless boost PFC system with input diodes to reduce common mode electromagnetic interference (CM EMI). In this system, a small portion of the current through boost chokes L1 and L2 flows through input diodes D3 or D4, but this current does not flow in either of the current sensing resistors R2 or R3. Therefore, for the implementation of an EMI solution, the THD performance of the PFC system has to be taken into consideration.

Figure 7:
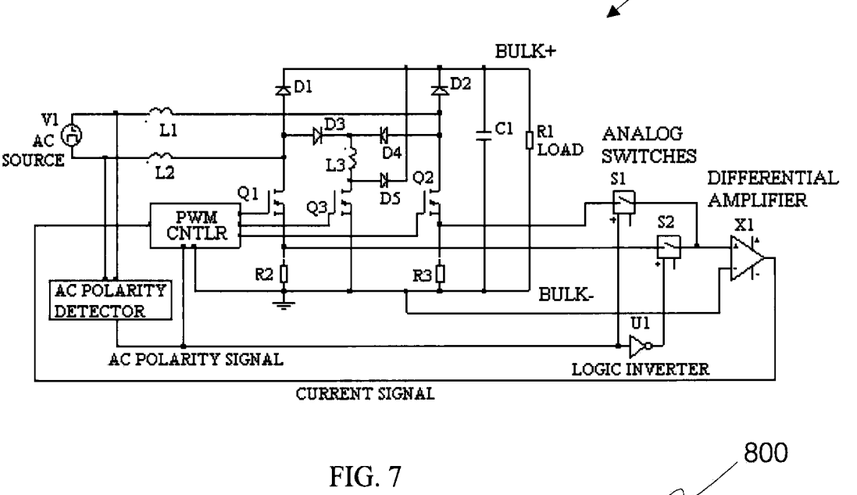
FIG. 7 illustrates an application of the system of FIG. 3 to a bridgeless boost PFC system with active zero voltage switching (ZVT).

FIG. 7 illustrates an application of the system in accordance with the present disclosure to a bridgeless boost PFC system with active zero voltage switching (ZVT). The system represented in FIG. 7 illustrates one of a number of possible active zero voltage switching (ZVT) circuits for use with a bridgeless boost PFC system. Two current sensing resistors R2 and R3 are connected in the circuit to provide a sensed current signal to a PWM controller PWM CNTRL in the same way as described in the embodiment of the present disclosure illustrated in FIG. 3 above.

Figure 8:
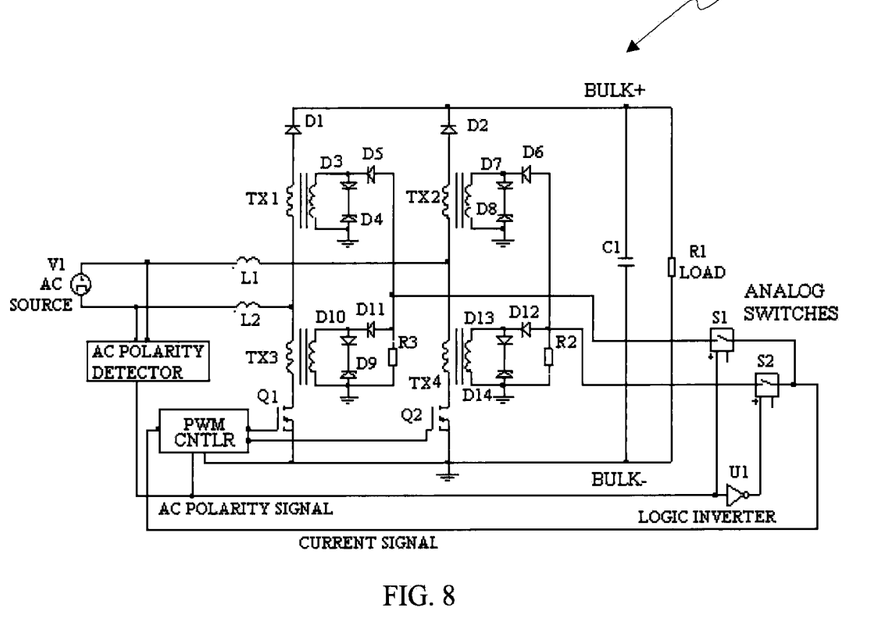
FIG. 8 illustrates an application of the system of FIG. 3 to a bridgeless boost PFC system with four CTs.

FIG. 8 illustrates a bridgeless boost PFC system with four CTs, utilizing the signal selection scheme in accordance with the present disclosure shown in FIG. 3. The signal selection scheme as described in the embodiment of the present disclosure shown in FIG. 3 can be applied to systems using four CTs for current sensing. Accordingly, a CT load resistor is separated into two components, R2 and R3, and on any given AC line half cycle one resistor is selected using analog switches S1 and S2. With this arrangement the ripple signal from the MOSFET which is biased 'ON' is rejected so that the reconstructed sensed current signal follows the average choke current rather than the peak. Since a CT can supply a higher output voltage than a current sensing resistor, the differential amplifier can be eliminated from this system.

By suitable selection of the ratings of the resistors R2 and R3 (shown in FIG. 3) and the PWM controller PWM CNTRL, the differential amplifier X1 (shown in FIG. 3) in the current sensing circuit can be eliminated from the system shown in FIG. 3.

Again, it is possible to eliminate 2 resistors from the set of resistors (R4, R5, R6 and R7 shown in FIG. 3) by ensuring that the signals from the two resistors used are equal.

Figure 9:
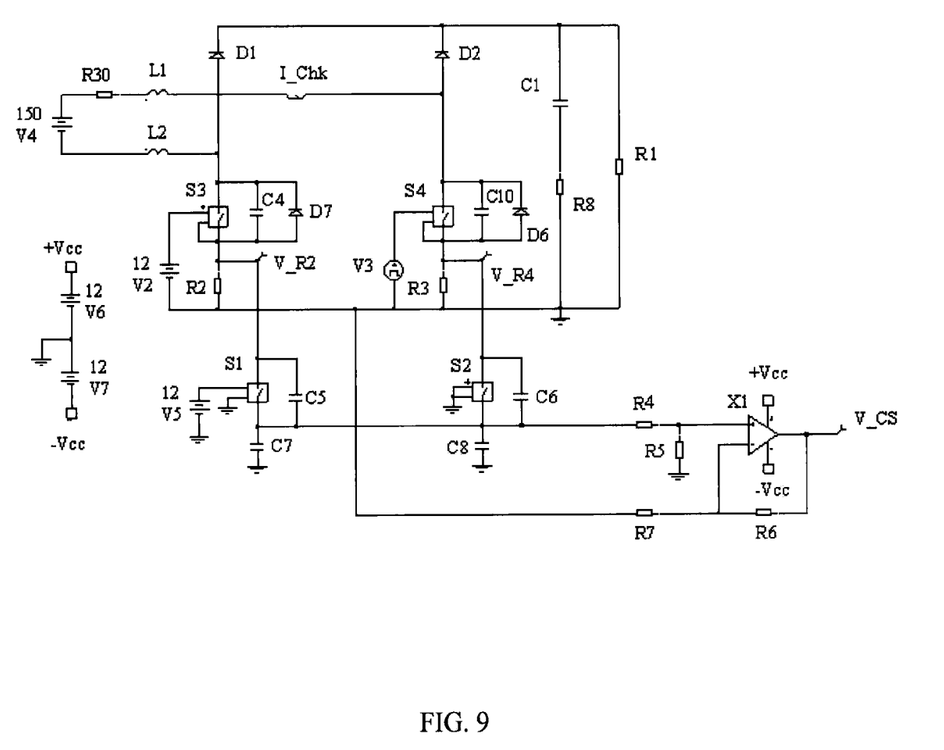
FIG. 9 illustrates a circuit for simulation of the system of FIG. 3.

FIG. 9 illustrates a circuit for simulation of the bridgeless boost PFC system of FIG. 3. The simulation scheme was made to operate at 140 KHz with about 2200 W output at 400V DC. To speed up the simulation, several simplifications were made. In the circuit shown in FIG. 9, the MOSFETs were modeled using simple switches S3 and S4, each switch having its output capacitance and body diode modeled using discrete components. In a real design each MOSFET could be two IPW60R075CP parts in parallel. Switch S3 was biased 'ON' continuously by a voltage source V2 while switch S4 was switched at 140 KHz by a PFC PWM controller V3. V3 could be an L4981. Only a very small portion of the AC input waveform was simulated so that the instantaneous AC input voltage V4 was assumed to be +150V. Loss resistances R8 and R30 were added to emulate a real design. Ideal models of diodes D1 and D2 were used in the simulation circuit, but in a real design the boost diodes D1 and D2 could be CSD20060 silicon carbide parts. The internal capacitances of the analog switches S1 and S2 were modeled by C5, C6, C7 and C8. The opamp X1 was modeled using a TL072 but in a real design the part could be a TLC4501AID. The TL072 has a similar gain bandwidth product to the TLC4501AID. The gain of X1 was set to five by resistors R4, R5, R6 and R7. Analog switch S1 was biased 'ON' continuously by a voltage source V5 while switch S2 was 'OFF'.

In a real application an additional circuit would be needed to sense the polarity of the AC input voltage, and depending on the polarity it would direct the PWM signal to either switch S3 or S4, while the other switch is biased 'ON' continuously. It would also switch 'ON' switches, S1 or S2 appropriately. Although it is not shown, a simple circuit that performs this function has been simulated and uses an LM358 quad opamp, an LM339 comparator, and a CD4011 quad NAND gate.

Figure 10:
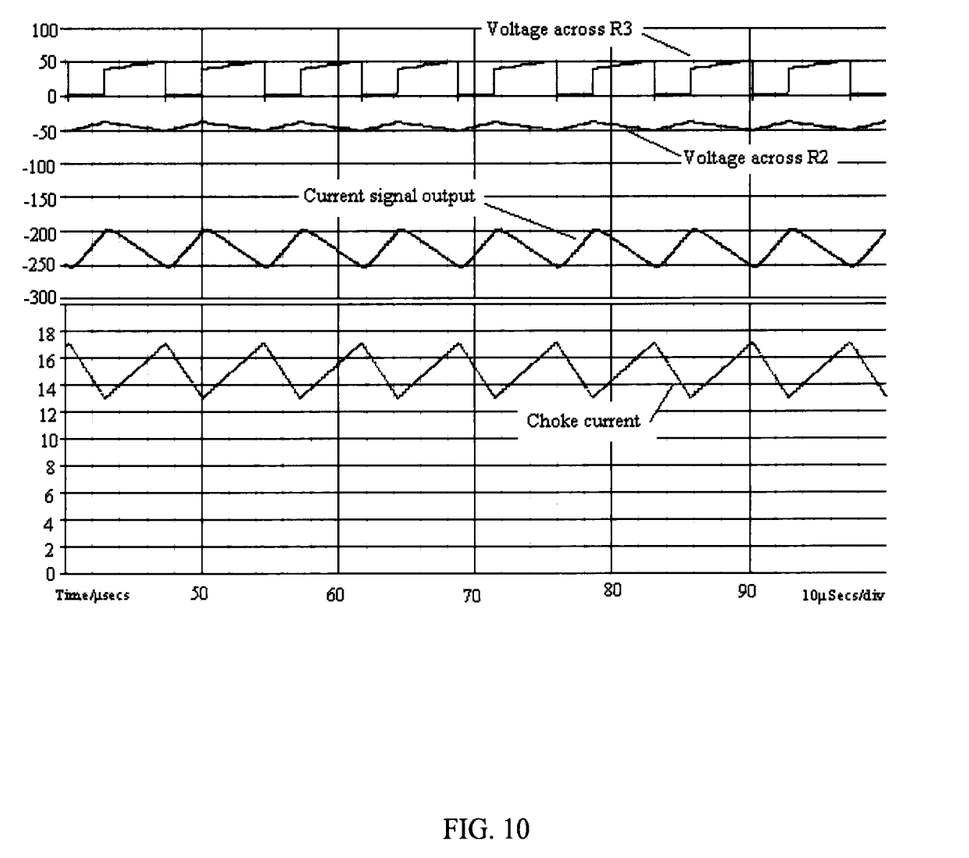
FIG. 10 illustrates a simulation waveform obtained as a result of the simulation performed in accordance with the circuit shown in FIG. 9.

FIG. 10 illustrates a simulation waveform obtained as a result of the simulation performed in accordance with the circuit shown in FIG. 9. The voltage across R3 is a positive pulsating waveform which was rejected. The voltage across R2 was about −45 mV average and was amplified by five to about −225 mV average which was suitable for a typical current signal.

The bridgeless boost PFC system using resistive current sensing as described in this disclosure has several technical advantages including but not limited to the realization of:
  a simple method for current sensing;
  a reliable and efficient system with very few components;
  a system that takes less PCB space than a CT solution for current sensing;
  a system with low power dissipation without compromising on the efficiency of the system;
  a system that takes care of the parasitic inductances and does not increase the THD of the PFC circuit;
  a system that is cost effective; and
  a system that does not introduce parasitic inductances into the power circuit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A bridgeless boost power factor correction (PFC) system comprising:
  a first input for connection to a first line of an alternating current (AC) source;
  a second input for connection to a second line of the AC source;
  an output for delivering an output of the bridgeless boost PFC system;
  a first boost choke coupled to the first input;
  a second boost choke coupled to the second input;
  at least one current sensing resistor coupled in series with
    a source terminal of a semiconductor switch in each return path of the current through the first boost choke and the second boost choke during each half cycle of the AC source;
a PWM controller adapted to control the semiconductor switch in each of said return paths, to further control the flow of current to a load to achieve power factor correction;
at least one selection switch coupled to each of said current sensing resistors to alternately enable or prevent the transmission of sensed current signals to the PWM controller;
a logic inverter adapted to change the state, alternately, of said selection switches during each half cycle of the AC source; and
an AC polarity sensing circuit adapted to provide signals corresponding to each half cycle of the AC source to the PWM controller and said logic inverter.

2. The bridgeless boost PFC system of claim 1, wherein said selection switches are selected from a group consisting of analog switches, Bipolar Junction Transistors (BJTs) and diodes.

3. The bridgeless boost PFC system of claim 1, wherein the first boost choke and the second boost choke are wound on a same magnetic core.

4. The bridgeless PFC system of claim 1 further comprising a differential amplifier coupled between said selection switches and the PWM controller to amplify said sensed current signal.

5. The bridgeless boost PFC system of claim 4, wherein said differential amplifier is adapted to provide a voltage gain of 5.

6. The bridgeless boost PFC system of claim 4, wherein said selection switches are selected from a group consisting of analog switches, Bipolar Junction Transistors (BJTs) and diodes.

7. The bridgeless boost PFC system of claim 4, wherein said selection switches are analog switches selected from CD4000 series logic chips.

8. An AC power supply unit including the PFC system of claim 1.

9. A bridgeless boost power factor correction (PFC) system comprising:
a controller for controlling operation of the system to produce a direct current (DC) output from an alternating current (AC) input;
an input for receiving an AC input, the input having a first input terminal and a second input terminal;
a first boost inductor coupled to the first input terminal;
a second boost inductor coupled to the second input terminal;
a first power switch coupled to the first inductor;
a second power switch coupled to the second inductor;
a first sensor coupled in series with the first power switch to generate a first current signal;
a second sensor coupled in series with the second power switch to generate a second current signal; and
a selection circuit coupled to the first sensor and the second sensor, the selection circuit adapted to alternately couple the first current signal and the second current signal to the controller.

10. The PFC system of claim 9 wherein the first sensor and the second sensor are resistors.

11. The PFC system of claim 9 wherein the first sensor and the second sensor each include at least one current transformer.

12. The PFC system of claim 9 wherein the selection circuit includes a first selection switch coupled to the first sensor and a second selection switch coupled to the second sensor, and wherein the selection circuit is adapted to alternately close the first selection switch and the second selection switch to alternately couple the first current signal and the second current signal to the controller.

13. The PFC system of claim 12 further comprising a polarity detector coupled to the first selection switch and the second selection switch to alternately close the first selection switch and the second selection switch.

14. The PFC system of claim 9 wherein the selection circuit includes an amplifier to amplify whichever of the first current signal and the second current is coupled to the controller.

15. A method of operating a bridgeless boost power factor correction (PFC) system having a controller for controlling operation of the system to produce a direct current (DC) output from an alternating current (AC) input having a first half cycle and a second half cycle, an input for receiving the AC input, a first boost inductor and a second boost inductor coupled to the input, a first power switch coupled to the first inductor, a second power switch coupled to the second inductor, a first sensor coupled in series with the first power switch, a second sensor coupled in series with the second power switch, a first selection switch coupled to the first sensor, and a second selection switch coupled to the second sensor, and wherein the first selection switch is operable to couple the output of the first sensor to the controller and the second selection switch is operable to couple the output of the second sensor to the controller, the method comprising:
coupling an output of the first sensor to the controller and decoupling an output of the second sensor from the controller during substantially all of the first half cycle; and
coupling an output of the second sensor to the controller and decoupling an output of the first sensor from the controller during substantially all of the second half cycle.

* * * * *

UNITED STATES PATENT AND TRADEMARK OFFICE
CERTIFICATE OF CORRECTION

| | | |
|---|---|---|
| PATENT NO. | : 8,717,791 B2 | Page 1 of 1 |
| APPLICATION NO. | : 12/570021 | |
| DATED | : May 6, 2014 | |
| INVENTOR(S) | : Wildash | |

It is certified that error appears in the above-identified patent and that said Letters Patent is hereby corrected as shown below:

In the Specification:

In column 8, line 6, replace "51" with "S1"

Signed and Sealed this
Fourteenth Day of October, 2014

Michelle K. Lee
*Deputy Director of the United States Patent and Trademark Office*